No. 723,384. PATENTED MAR. 24, 1903.
J. HARRIS.
DENTAL MANDREL.
APPLICATION FILED JAN. 27, 1903.
NO MODEL.
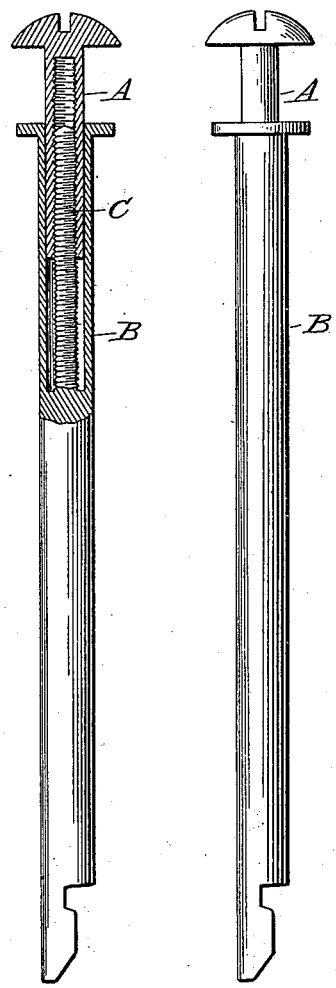
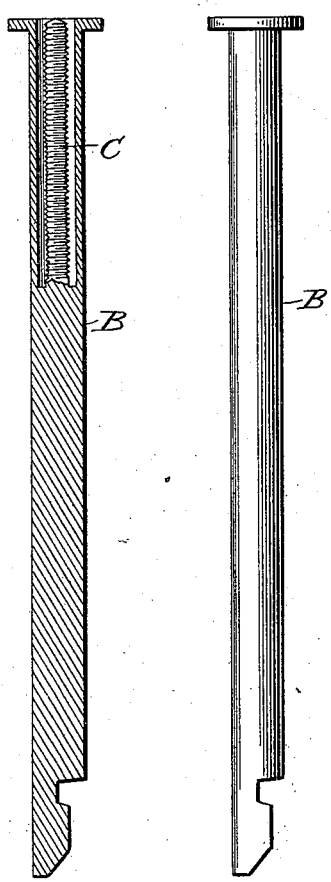
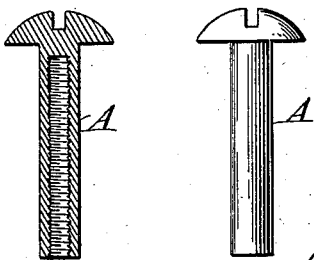
Witnesses
F. N. Roehrich
John J. Peary
Julius Harris,
Inventor

UNITED STATES PATENT OFFICE.

JULIUS HARRIS, OF NEW YORK, N. Y.

DENTAL MANDREL.

SPECIFICATION forming part of Letters Patent No. 723,384, dated March 24, 1903.

Application filed January 27, 1903. Serial No. 140,759. (No model.)

*To all whom it may concern:*

Be it known that I, JULIUS HARRIS, residing at 26 West One hundred and sixteenth street, borough of Manhattan, city, county, and State of New York, have invented a new and useful Mandrel for Use in Dental Work, of which the following is a specification.

My invention relates to the improvement of a dentist's mandrel. Such mandrel is, generally speaking, a shaft or spindle on which a disk of carborundum (or other substance) or paper is fixed for rotation. The disk to be revolved is held in place on the head of the shaft by means of a pin which passes through an opening in the center of the disk and screws into the head of the shaft. (Mandrels have been made in which the pin is held in place by other means than by the threads of a screw; but the common mandrel has the screw arrangement.) In the common mandrel the pin is threaded on the outside and the head of the shaft on the inside. Hence when taking off a disk the sides of the opening in its center come in contact with the threads on the pin and gradually wear them off.

The object of my improvement is to provide a mandrel in which the threads on the pin will not come in contact with the grinding substance, thereby preventing the wear and tear on the threads of the pin and necessarily giving the mandrel a much longer life. I attain this object by the mechanism illustrated in the accompanying drawings, in which—

Figure 1 is a vertical section of the entire mandrel. Fig. 2 is a vertical section of the pin, and Fig. 3 is a vertical section of the shaft. Beside each figure is a side view, which, however, I do not use in my explanation.

Similar letters refer to similar parts throughout the several views.

A represents the pin.

B represents the shaft generally, and C a pin inside the shaft extending upward, so as to meet the pin A. Its length is about one-third the entire length of the shaft.

The body of the pin A is smooth on the outside. It is hollow and has an inside thread. The head of this pin is the ordinary head for a mandrel-pin. The shaft B is bored at its head deep enough to permit the pin A to enter its full length; but there is left standing in the center of the shaft B the pin C, which has an outside thread to fit the inside thread in the body of the pin A. The shaft B and the pin A are connected by screwing the pin A onto the pin C. The body of the pin A is of width small enough to pass through the opening in the ordinary disk, and passing through such opening and screwing onto the pin C it holds the disk in place, so that it may be rotated.

I am aware that prior to my invention mandrels have been made in which the pin screws into the shaft. Therefore I do not claim such an arrangement broadly; but What I do claim as my invention, and desire to secure by Letters Patent, is—

In a dental mandrel the combination of the interiorly-screw-threaded pin, with the exteriorly-threaded screw inclosed within and forming a part of the shaft, substantially as described.

In testimony whereof I have signed my name to this specification in the presence of two subscribing witnesses.

JULIUS HARRIS.

In presence of—
A. J. O'LEARY,
JOHN J. O'LEARY